United States Patent [19]
Case et al.

[11] Patent Number: 5,164,953
[45] Date of Patent: Nov. 17, 1992

[54] POPULATION INVERSION BY EXCITED ENERGY LEVEL ABSORPTION

[75] Inventors: William E. Case, Arlington; Mark E. Koch, Farmers Branch, both of Tex.

[73] Assignee: LTV Aerospace and Defense Company, Grand Prairie, Tex.

[21] Appl. No.: 604,614

[22] Filed: Oct. 26, 1990

Related U.S. Application Data

[63] Continuation-in-part of Ser. No. 387,667, Jul. 31, 1989.

[51] Int. Cl.[5] .............................................. H01S 3/09
[52] U.S. Cl. ........................................... 372/69; 372/41
[58] Field of Search ........................ 372/69, 70, 41, 6

[56] References Cited

U.S. PATENT DOCUMENTS

| | | | |
|---|---|---|---|
| 3,395,356 | 7/1968 | Snitzer | 330/4.3 |
| 3,462,707 | 8/1969 | Pearson et al. | 331/94.5 |
| 3,470,490 | 9/1969 | Held et al. | 331/94.5 |
| 3,493,891 | 2/1970 | Fern et al. | 331/94.5 |
| 3,533,956 | 10/1970 | Snitzer | 252/301.2 |
| 3,624,549 | 11/1971 | Geusic et al. | 331/94.5 |
| 3,715,683 | 2/1973 | Weber | 331/94.5 |
| 3,786,365 | 1/1974 | Robinson et al. | 372/70 |
| 4,087,765 | 5/1978 | Edelstein et al. | 372/57 |
| 4,257,013 | 3/1981 | Pike et al. | 372/70 |
| 4,380,072 | 4/1983 | Harris | 372/5 |
| 4,414,671 | 11/1983 | Wells, Jr. et al. | 372/73 |
| 4,477,906 | 10/1984 | Case | 372/41 |
| 4,633,475 | 12/1986 | Harper et al. | 372/41 |
| 4,693,545 | 9/1987 | Henningsen et al. | 372/6 |
| 4,701,928 | 10/1987 | Fan et al. | 372/68 |
| 4,746,484 | 5/1988 | Jassby | 376/146 |
| 4,807,240 | 2/1989 | Goldstone | 373/69 |
| 4,811,349 | 3/1989 | Payne et al. | 372/41 |
| 4,859,016 | 8/1989 | Shaw et al. | 372/69 |
| 4,875,213 | 10/1989 | Lo | 372/5 |
| 4,967,416 | 10/1990 | Esterowitz et al. | 372/41 |
| 5,022,040 | 6/1991 | Pollack et al. | 372/69 |

OTHER PUBLICATIONS

G. Huber, et al., "CW Double Cross Pumping of the $^5I_7$-$^5I_8$ Laser Transition in Ho$^{3+}$ Doped Garents," *App. Phys. Lett.* 28(23), pp. 1562-1563 (Jun. 9, 1986).

K. Kishino et al., "Fabrication and Lasing Characteristics of 0.67 μm GaInAsP AlGaAs Visible Lasers Prepared by Liquid Phase Epitaxy on (100) GaAs Substrates," *IEEE J. Quantum Electronics*, vol. QE-23, No. 2, pp. 180-187 (Feb. 1987).

R. C. Sze, et al., "Discharge Excitation of the XeF C to A Transition," *NTIS Report No. LA-UR* 88-656 (Dec. 1987).

Carl B. Collins, "The Nitrogen Ion Laser Pumped by Charged Transfer," *IEEE J. Quantum Electronics*, vol. QE-20, No. 1, pp. 47-63 (Jan. 1984).

D. H. Strome, "Cinematic Infrared Scene Simulator Based on Vanadium Dioxide Spatial Modulator," *Proceedings of SPIE*, vol. 465, pp. 192-196 (Jan. 26-27, 1984).

F. Varsanyi, "Surface Lasers," *App. Phys. Lett.*, vol. 19, No. 6, pp. 169-171 (Sep. 15, 1971).

K. German et al., "Radiative and Nonradiative Transitions of Pr$^{3+}$ in Trichloride and Tribromide Hosts," *Phys. Rev. B*, vol. 11, No. 7, pp. 2436-2442 (Apr. 1, 1975).

W. E. Case, "Possibility of Infrared Lasing with Pr$^{3+}$," *CATC Report No. B-94100/8TM-2*, pp. 1-7 (Apr. 18, 1978).

Duczynski et al. "CW Double Cross Pumping of the 5/7-5/8 Laser Transition in HO$^{3-}$ Doped Garnets"; Appl. Phys. Lett. 48(23) Jun. 9, 1986.

J. J. Ewing; Laser Handbook vol. 3; Stitch; North-Holland Pub. Co. 1979.

*Primary Examiner*—Leon Scott, Jr.
*Attorney, Agent, or Firm*—Richards, Medlock & Andrews

[57] ABSTRACT

Devices and methods are taught by this invention of populating excited energy levels with fundamental particles. When these populated excited energy levels are further pumped, a population inversion used in quantum electronic applications can result. Each of the various methods involve pumping on an excited energy level of an elemental physical system to cause, by the absorption of energy, the transition of fundamental particles from the excited energy level to a higher energy level. Part of the energy is used for transition of fundamental particles residing in neighboring elemental physical systems from the lowest energy to the excited energy level.

103 Claims, 5 Drawing Sheets

AVALANCHE DRIVEN THULIUM-HOLMIUM
CROSS-PUMPED LASER

POPULATION INVERSION BY EXCITED ENERGY LEVEL ABSORPTION

This is a continuation-in-part of copending U.S. patent application Ser. No. 07/387,667 filed Jul. 31, 1989.

TECHNICAL FIELD OF THE INVENTION

This invention relates in general to building populations of fundamental particles in excited energy levels. In one aspect, the invention relates to creating population inversions used in quantum electronic applications, and to population inversion and cross-pumping that results from pumping transitions between excited energy levels.

Many quantum electronic devices, for example lasers, light amplifiers, and modulators, operate by energy excitation and subsequent radiative emission between different electronic configurations of elemental physical systems, such as atoms, molecules, or ions.

An elemental physical system (herein sometimes referred to as an EPS) is a collection of fundamental particles, typically electrons and nucleons, which can exist together in a number of distinguishable configurations (herein sometimes referred to as "states"). The simplest elemental physical systems most often considered are atoms, molecules, or ions. However, the elemental physical system could be free electrons moving in a periodic electromagnetic field. Elemental physical systems also could be electrons and holes in quantum-well structures under various electric and magnetic forces.

A hydrogen atom is a type of EPS having two fundamental particles, an electron and a proton. The electron may exist in different states, each state being distinguished by a set of quantum numbers. In one state, the hydrogen atom's electron may have one spin orientation, while in another state, the electron may have a different spin orientation. In yet another state, the electron may be in a different orbit than in the first state.

Work must be done on or extracted from an elemental physical system for that EPS to changes its state. During such a change, the physical parameters, for example spin orientation or orbital motion of electrons in the case of an ion EPS, also change. Accordingly, there is an energy associated with each different state of an EPS, and the states can be arranged in a so-called energy level scheme of increasing energy.

The state associated with the minimum energy that the EPS is capable of having is called the ground state, while states associated with higher energy levels are referred to as excited states. It should be noted that while no two states are the same, their energy levels may be; however, it is common to refer to a state by its energy level. For example, it is sometimes said that EPS's "have" an excited energy level when referring to the capability of a particular EPS to exist in a state having some level of energy associated therewith which is greater than the energy associated with the ground state; or it may be said that a particle has moved from one energy level to another, meaning that the state of the EPS has changed.

In order to simplify the conceptual basis of this invention, the following discussion refers principally to electronic transitions between electronic configurations resulting from different electronic motions in an elemental physical system. However, it is to be understood that this discussion applies equally well to transitions involving other fundamental particles such as nucleons or muons, and that configurations could be other than electronic resulting, for example, from nuclear or muonic motions. The configurations could also result from vibrational or rotational motions, or a combination of electronic vibrational and rotational motions.

FIG. 1 illustrates the occupation probability for three (non-degenerate) energy levels of an elemental physical system under thermal equilibrium conditions at temperature T. The probability that an electron of an elemental physical system exists in an excited energy level (level 1 or level 2) as opposed to the ground state is proportional to the Boltzmann factor $EXP(-E_j/kT)$, where k is the Boltzmann constant and $E_j$ is the energy of excitation for a particular energy level (j) relative to the ground state energy level. An excited energy level is an energy level having an energy at least kT from the ground state. Usually $E_j$ is much greater than kT meaning that the electrons are most probably located in the ground state of the elemental physical system. Even at the highest temperatures, the occupation probability decreases as the energy spacing increases from energy level zero (the ground state) to the higher numbered energy levels (the excited states).

Several methods may be used to supply energy to the system of FIG. 1 so that the probability of finding an electron in the higher energy levels is more likely. The energy can be supplied by irradiation with either coherent (laser) or incoherent (flash lamp) light sources, which is referred to as optical pumping. Electrical methods such as current injection at semiconductor interfaces (laser diodes) and voltage discharges in gases ($CO_2$ lasers) can also be used.

FIG. 2 shows the result of supplying such energy to the system of FIG. 1. The excitation source used to supply energy to the system, pump 30, induces transitions from the ground state to excited state energy level 2 at a rate W (transitions/second). The electrons in the upper energy level states naturally tend to decay back down to the lower energy level states at some rate called the natural decay rate. Depending on the lifetimes of the electrons in the upper energy levels and the pumping strength (W), the probability of finding electrons in the upper energy levels compared to the lower energy levels may be higher, creating what is called population inversion. Systems with a population inversion between two levels exhibit optical gain in a wavelength band corresponding to a transition from the upper to the lower level. It is well known that optical gain is a prerequisite for laser action, which is usually accomplished by placing the system in an optical cavity comprising two mirrors.

FIG. 2A depicts a situation where, as a result of pumping the system, the probability of finding electrons in energy level 2 is greater than finding the electrons in energy level 1, but the probability of finding electrons in energy level 2 is smaller than the probability of finding electrons in energy level 0. This situation can occur if the lifetime of the electrons in energy level 1 is shorter than the lifetime of the electrons in energy level 2, meaning that any electrons excited into energy level 1 quickly decay down to the ground state. Since there is population inversion between level 2 and level 1, laser action is possible between level 2 and level 1.

In FIG. 2B, the probability of finding electrons in energy level 2 is approximately equal to the probability of finding electrons in energy level 0, and the probability of finding electrons in energy level 1 is greater than the probability of finding electrons in energy level 0.

This situation occurs when the lifetime of the electrons in energy level 1 is much longer than the lifetime of electrons in energy level 2. Since there is population inversion between level 1 and level 0, laser action is possible between level 1 and level 0.

The method of population inversion illustrated in FIGS. 2A and 2B is a simplified illustration. The energy diagram in FIGS. 2A and 2B is not often found in nature. Actual energy level configurations are much more complicated containing features such as degenerate or quasi-degenerate energy levels, a greater number of energy states, and band structures along with discrete states. Furthermore, certain transitions between energy levels are forbidden depending on selection rules. In addition, the method of exciting electrons to the excited energy states can involve continuous-wave or pulsed pumping systems. The pumping can cause excitation to the excited energy states directly, or indirectly using two component, or so-called donor-acceptor, systems.

Irrespective of complexity, all prior art population inversion and laser systems, except the Case 4,477,906 patent described below, have a common element—the excitation of the system involves pumping on the ground state energy level or an energy level with an energy within kT of the ground state. Pumping on an excited energy level would not be considered practical since the probability of finding electrons in excited energy levels is extremely low.

The Case 4,477,906 patent (hereinafter sometimes referred to as the '906 patent) disclosed that under certain conditions pumping on excited energy levels could produce population inversion, and even lasing.

Referring now to FIG. 2C, a generalized energy level scheme of two EPS (A and B) is shown. The lines numbered 0-5 are the designated energy levels, but other energy levels may be present as indicated by the dashed lines. The double line arrow indicates a possible transition induced by an external pump source at rate W; curved arrows represent natural processes by which an excitation at one level decays to an excitation at a lower energy level. The up and down arrows connected by the dashed line designate an internal process taking place between neighboring EPS's called cross-relaxation. As seen in FIG. 2C, level 0 represents the ground level, level 1 represents a "pump from" or absorber level, level 2 represents an "excite to" level, level 3 indicates a "decay to" level, level 4 indicates a "decay from" level, and level 5 indicates a "pump to" level. The '906 patent discloses a system in which levels 1, 2, and 3 are the same level (i.e., levels within a kT spacing) and in which the difference in energy between levels 4 and 3 substantially equals the difference in energy between levels 2 and 0.

For example, a simplified energy level scheme is shown in FIG. 3, which is disclosed in the '906 patent. In FIG. 3, each EPS comprises at least four energy levels, with the energy spacing between the ground level (energy level 0) and the first excited state level (energy level 1) being substantially equal to the spacing between the first excited state level and the second excited state level (energy level 2). Pumping, with pump 30, between energy levels 1 and 3 induces a transition of electrons from energy level 1 to energy level 3. This arrangement is illustrated for the elemental physical system labeled A in FIG. 3. Elemental physical system A by itself will not lead to population inversion because as discussed, the probability of finding electrons in energy level 1 is low. However, the addition of a neighboring elemental physical system of the same type as A, labeled B in FIG. 3, provides a mechanism for transfer of energy between elemental physical systems A and B to increase the population of energy level 1. As examples, EPSs A and B may be fixed in close proximity (as are ions in a crystal lattice) or be neighbors for a time corresponding to a collision (as in a gas). It should be understood that both systems A and B are pumped, although FIG. 3 only illustrates pumping on system A for clarity.

Assuming that an electron in system B is excited to energy level 3 and subsequently decays down to excited energy level 2, the energy corresponding to the spacing between energy level 2 and energy level 1 of system B is transferred, as illustrated by dashed line 10, to system A, exciting an electron in the ground level of system A from the ground state to energy level 1 (arrow 12).

After transferring its energy, the electron in system B resides in energy level 1, as illustrated by arrow 14. This process results in both systems A and B having electrons in energy level 1 which are available for pump excitation. Electrons in energy level 1 which are then pumped to energy level 3 can decay down to energy level 2 to provide energy for other electrons in neighboring elemental physical systems to be excited from the ground state to energy level 1. This method builds-up the population of electrons in energy level 1. When the population of energy level 1 is built-up, a further increase in the pump rate will create a population inversion between level 2 and level 1, level 2 and level 0, or level 1 and level 0.

The process of transferring part of the energy of an electron in an excited state from one elemental physical system to a second elemental physical system to raise an electron to an excited state in the second elemental physical system is often called cross-relaxation. Cross-relaxation can be resonant or non-resonant. In a resonant cross-relaxation process, the energy lost by transition of an electron in one elemental physical system is used entirely by transitions of electrons in one or more neighboring elemental physical systems. In a non-resonant cross-relaxation process, the energy lost by one elemental physical system is not equal to the energy gain of its neighbors. The balance of energy is provided through an ancillary process, such as the absorption or emission of photons, or phonons in solid or liquid media or collisions in gases, or other energy quanta.

The mechanism for both resonant and non-resonant transfer of energy may be further classified as either radiative or nonradiative. A radiative transfer involves the emission of a photon by one elemental physical system and its subsequent absorption in another elemental physical system. Nonradiative transfers include any other energy transfers between elemental physical systems which do not predominantly involve emission of a photon by one elemental physical system and its subsequent absorption in another elemental physical system. FIG. 3 illustrates a cross-relaxation process. Whether the cross-relaxation is resonant or non-resonant is not illustrated.

It is noted that the population build-up of energy level 1 competes with the tendency of electrons to decay back to the ground state in systems A and B. Therefore, a critical pump rate must be exceeded before the population of energy level 1 becomes self-sustaining. If the pump rate is less than critical, the probability that electrons are occupying energy level 1 decreases to zero over a period of time. Above the critical pump rate, there is a so-called "avalanche" of electrons populating energy level 1.

In summary, the '906 patent discloses a method and apparatus for population inversion of EPSs, based on photon avalanche absorption in one species of EPS and in which the cross-relaxation process involves only three energy levels. The '906 patent discloses a "pump from" energy level that is an excited level and identical to one of the cross-relaxation levels.

The phenomena of cross-pumping is similar to that of cross relaxation; however, cross-pumping occurs between two elemental physical systems of different types, such as two different element dopant ions in a crystal. Using the crystal as an example, cross-pumping occurs when an electron associated with the first dopant ion is pumped from one energy level to another energy level and then decays. The decay may pass through intermediate levels, each decay resulting in the release of energy. When energy of the appropriate quanta is released, electrons in the second dopant ion are elevated. By proper choice of the dopants, population inversion can be achieved between two energy levels in the second dopant ion.

It should be noted that in some cases in this disclosure terminology is used which refers to creating populations of fundamental particles in one particular energy level or another. Such terminology should not be read to say that one particular energy level associated with one particular state of one particular elemental physical system (such as one ion) held all of the fundamental particles of the population. While such may be the case in some embodiments of the invention (for example, if one considers a crystal structure to be an elemental physical system), the practice of referring to creating populations in an energy level refers also to changing the state of numerous elemental physical systems to a state associated with a particular energy level, thus actually creating a population of elemental physical systems which exist in a state corresponding to that energy level. Therefore, it should be understood that reference to populations in particular energy levels includes reference to populations of elemental physical systems which exist in a state corresponding to a given energy level.

The prior art does not teach the building of populations of fundamental particles in excited energy levels and creating population inversions that will lead to the quantum electronic systems of the present invention. As one example, it is believed that new commercially desirable up-conversion lasers will result. Up-conversion lasers generate output light at a shorter wavelength than the pump light wavelength.

Shorter wavelength lasers have improved spatial resolution. Improved spatial resolution lasers would have practical uses in laser surgery and other medical applications. Such lasers would also be useful in certain military operations because short wavelength lasers have good transmission characteristics in sea water. Furthermore, short wavelength lasers would be beneficial in optical lithography.

In addition to lasers, other optical systems may emerge which will be based on these new methods for population inversion. Optical amplifiers, optical switches, and optical logic elements are specific examples.

SUMMARY OF THE INVENTION

As discussed, the Case 4,477,906 patent discusses systems in which the energy spacing between the ground state and the "excite to" state is substantially equal to the energy spacing between the "decay from" and the "decay to" states, and the neighboring EPS's (for example, ions) have substantially the same "excite to" state energy level as the "decay to" state energy level.

Recently, however, it has been discovered that population inversions can be created in elemental physical systems which have energy level schemes different from those shown in the '906 patent. The recognition that a large number of energy level schemes can lead to population inversion through the "avalanche" process is the subject of an embodiment of this patent application.

The recognition that a large number of energy level schemes can lead to population inversion through the "avalanche" process and the cross-pumping process is also the subject of an embodiment of this patent application.

Embodiments of the invention involve pumping on an excited energy level (sometimes referred to as the "pump from" or the absorber energy level) of an elemental physical system. The absorption of pump energy is in one-to-one correspondence with the transition of fundamental particles from the absorber level to a higher energy level. Part of the energy absorbed is utilized in the excitation of fundamental particles residing in neighboring elemental physical systems from a lower energy level to the absorber energy level. If the population of fundamental particles in the absorber level is to be sustained at an increased level, the rate of pumping should be at a rate greater than or at least equal to the rate at which the fundamental particles tend to naturally decay from the absorber level down to the lower levels. By maintaining a substantial population of fundamental particles in the absorber energy level, sufficient additional pumping on the absorber level will create population inversion, making optical gain and laser action possible.

Embodiments of the invention may use several methods by which the absorbed energy of one elemental physical system is utilized in the transition of fundamental particles residing in a neighboring elemental physical system from a lower energy level, such as the EPS' ground level, to the absorber energy level. One aspect of the invention uses resonant cross-relaxation, while another aspect uses non-resonant cross-relaxation.

The energy from one elemental physical system can be transferred to two or more elemental physical systems to raise a fundamental particle in each of the neighboring elemental physical systems to an excited energy level, either through resonant or non-resonant cross-relaxation. In addition, the absorbed energy in an elemental physical system may be utilized for the transition of fundamental particles residing in a first neighboring elemental physical system from a lower energy level to a higher energy level, and in turn, the energy absorbed in the first neighboring elemental physical system is utilized for the transition of fundamental particles in a second neighboring elemental physical system from a lower energy level to the absorber energy level. In any case, the transfer of energy between neighboring elemental physical systems provides feedback to sustain a population of fundamental particles in an absorber level from which the fundamental particles can be pumped.

There are several methods also of pumping energy into each elemental physical system. For example, optical or electrical means could be used to cause direct or indirect transitions from the absorber level to a higher energy level. (An indirect transition involves an intermediate step in the transition process.)

The energy levels may be a property of each elemental physical system, or a collective state of neighboring systems, or even part of a band of energies not associated with any subgroup of elemental physical systems. In fact, there are numerous ways, by varying or combining the above methods, of populating excited energy levels with fundamental particles using the concept of population inversion by pumping on excited states.

Avalanche-driven, cross-pumped embodiments of the invention are also provided herein.

Although described herein by referring to charged particles, for example electrons and lasers, it should be noted that the invention includes the use of other fundamental particles and the emission of other frequencies of electromagnetic radiation. Also, although the invention is discussed referring to differing embodiments, such embodiments are provided by way of example only, and they are not intended to represent the sole embodiments of the invention.

According to one aspect of the invention, there is provided a device for creating populations of fundamental particles in excited levels of elemental physical systems comprising a plurality of elemental physical systems having associated therewith a ground level, a "pump from" level, a "pump to" level, an "excite to" level, a "decay from" level, a "decay to" level. In accordance with this aspect, a plurality of fundamental particles resides in any or all of the levels, and the "pump from" level is different from the "excite to" level. An energy source is also provided (for example, a laser), positioned and arranged to supply energy to the plurality of elemental physical systems such that fundamental particles that reside in the "pump from" level absorb energy from the energy source and transition to the "pump to" level at a rate greater than the rate at which fundamental particles decay from the "pump from" level to the ground level.

Also, according to one aspect of the invention, there is provided a device for creating populations of fundamental particles in excited levels of elemental physical systems comprising a plurality of elemental physical systems having associated therewith a ground level, a "pump from" level, a "pump to" level, an "excite to" level, a "decay from" level, a "decay to" level. In accordance with this aspect, a plurality of fundamental particles resides in any or all of the levels, the "pump from" level being different from the "decay to" level. An energy source is also provided, positioned and arranged to supply energy to the plurality of elemental physical systems such that fundamental particles that reside in the "pump from" level absorb energy from the pump and transition to the "pump to" level at a rate greater than the rate at which fundamental particles decay from the "pump from" level to the ground level.

According to a further aspect of the invention, there is provided a device for creating populations of fundamental particles in excited levels of elemental physical systems comprising a plurality of elemental physical systems having associated therewith a ground level, a "pump from" level, a "pump to" level, an "excite to" level, a "decay from" level, a "decay to" level, and a plurality of fundamental particles residing in any or all of the levels, the "decay to" level being different from the "excite to" level. An energy source is also provided, positioned and arranged to supply energy to the plurality of elemental physical systems such that fundamental particles that reside in the "pump from" level absorb energy from the pump and transition to the "pump to" level at a rate greater than the rate at which fundamental particles decay from the "pump from" level to the ground level.

According to another aspect of the invention, there is provided a device for creating populations of fundamental particles in excited levels of elemental physical systems comprising a plurality of elemental physical systems having associated therewith a ground level, a "pump from" level, a "pump to" level, an "excite to" level, a "decay from" level, a "decay to" level, and a plurality of fundamental particles residing in any or all of the levels, the energy difference between the "decay from" level and the "decay to" level being different from the energy difference between the "excite to" level and the ground level. An energy source is also provided, positioned and arranged to supply energy to the plurality of elemental physical systems such that fundamental particles that reside in the "pump from" level absorb energy from the pump and transition to the "pump to" level at a rate greater than the rate at which fundamental particles decay from the "pump from" level to the ground level.

According to a further aspect of the invention, there is provided a process for increasing populations of fundamental particles in excited energy levels of elemental physical systems, wherein the elemental physical systems have associated therewith ground levels, "pump from" levels, "pump to" levels, "decay from" levels, "decay to" levels, and "excite to" levels, and wherein the "pump from" levels are different from the "decay to" levels, comprising the steps of: pumping fundamental particles from the "pump from" levels to the "pump to" levels, allowing decay from the "pump to" levels through the "decay from" and the "decay to" levels, and using at least some of the energy released during the decay between the "decay from" and the "decay to" levels to elevate fundamental particles to the "excite to" levels.

According to another aspect of the invention, there is provided a process for increasing populations of fundamental particles in excited energy levels of elemental physical systems, wherein the elemental physical systems have associated therewith ground levels, "pump from" levels, "pump to" levels, "decay from" levels, "decay to" levels, and "excite to" levels, and wherein the "pump from" levels are different from the "excite to" levels, comprising the steps of: pumping fundamental particles from the "pump from" levels to the "pump to" levels, allowing decay from the "pump to" level through the "decay from" and the "decay to" levels, and using at least some of the energy released during the decay between the "decay from" and the "decay to" levels to elevate fundamental particles to the "excite to" levels.

According to one aspect of the invention, there is provided a process for increasing populations of fundamental particles in excited energy levels of elemental physical systems, wherein the elemental physical systems have associated therewith ground levels, "pump from" levels, "pump to" levels, "decay from" levels, "decay to" levels, and "excite to" levels, and wherein the "decay to" levels are different from the "excite to" levels, comprising the steps of: pumping fundamental particles from the "pump from" levels to the "pump to" levels, allowing decay from the "pump to" levels through the "decay from" and the "decay to" levels, and using at least some of the energy released during the decay between the "decay from" and the "decay to" levels to elevate fundamental particles to the "excite to" levels.

According to one aspect of the invention, there is provided a process for increasing populations of fundamental particles in excited energy levels of elemental physical systems, wherein the elemental physical systems have associated therewith ground levels, "pump from" levels, "pump to" levels, "decay from" levels, "decay to" levels, and "excite to" levels, and wherein the energy difference between the ground levels and the "excite to" levels is different from the energy difference between the "decay from" and the "decay to" levels, comprising the steps of: pumping fundamental particles from the "pump from" levels to the "pump to" levels; allowing decay from the "pump to" levels through the "decay from" and the "decay to" levels, and using at least some of the energy released during the decay between the "decay from" and the "decay to" levels to elevate fundamental particles to the "excite to" levels.

According to some aspects of the invention, the plurality of fundamental particles comprise charged particles (for example, electrons or protons) or ions (for example, rare earth ions, actinide ions, or transition metal ions.

According to some aspects of the invention, some of said ions comprise Pr, Ho, and/or Tm.

According to some aspects of the invention, some of said ions reside in a gas and/or crystal.

According to some aspects of the invention, said crystal comprises $LaCl_3$, doped with $Pr^{+3}$ ions According to some aspects of the invention, said crystal comprises YAG, a majority dopant of Tm, and a minority dopant of Ho.

According to some aspects of the invention said energy source is a continuous wave laser and/or a pulsed laser having an output wavelength of about 677 nanometers.

According to some aspects of the invention, said continuous wave laser comprises $Ti:Al_2O_3$.

BRIEF DESCRIPTION OF THE DRAWINGS

Further features and advantages will become apparent from the following and more particular description of an embodiment of the invention, as illustrated in the accompanying drawings in which like reference characters refer to the same elements or functions throughout the views, and in which.

DETAILED DESCRIPTION

The following description discloses various methods of populating excited energy levels. When these populated excited energy levels are further pumped, the population inversion necessary for optical gain and laser action will result.

The various figures illustrate how energy absorbed in one elemental physical system can be utilized to populate electrons in an excited energy level (hereinafter sometimes called an absorber or "pump from" energy level) in a neighboring elemental physical system, or to populate absorber energy levels in multiple neighboring elemental physical systems.

Figure 1:
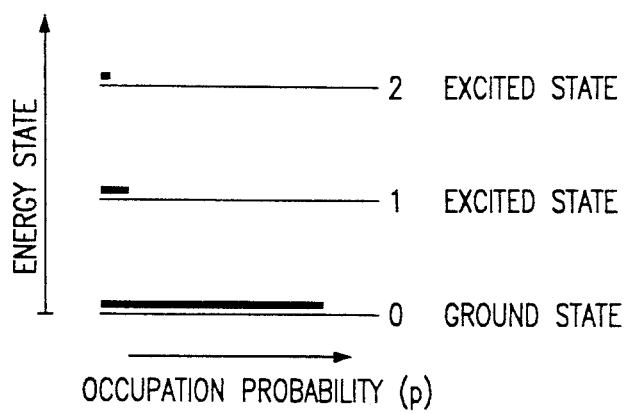
FIG. 1 is partial energy level diagram of an elemental physical system illustrating the occupation probability of fundamental particles as the energy of the system is increased by thermal excitation.
Figure 2A:
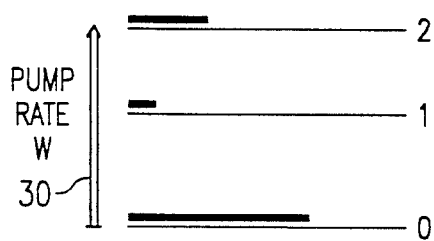
FIGS. 2A and 2B are partial energy level diagrams of an elemental physical system illustrating the occupation probability of fundamental particles as the energy of the system is increased, when the elemental physical system is being pumped.
Figure 2B:
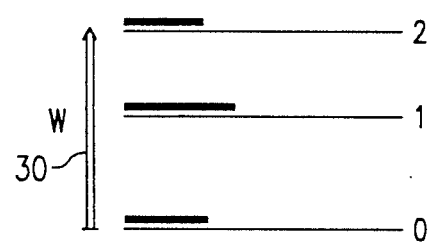
Figure 2C:
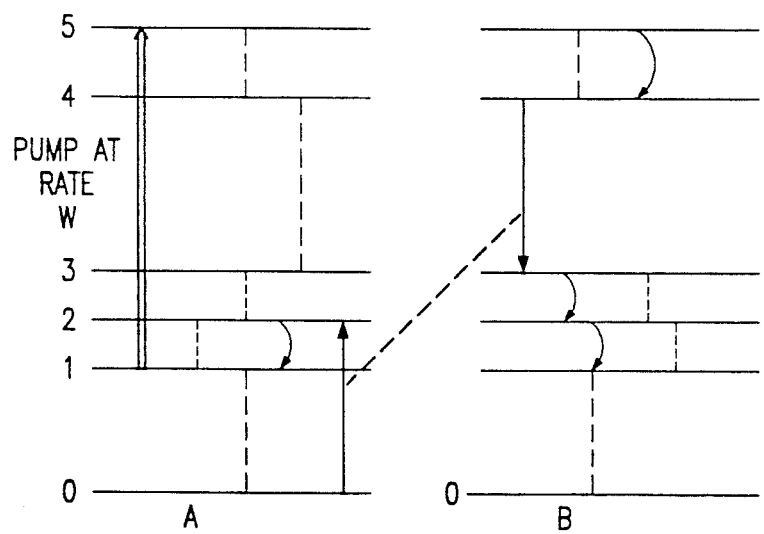
FIG. 2C illustrates a generalized energy level scheme for two elemental physical systems.
Figure 3:
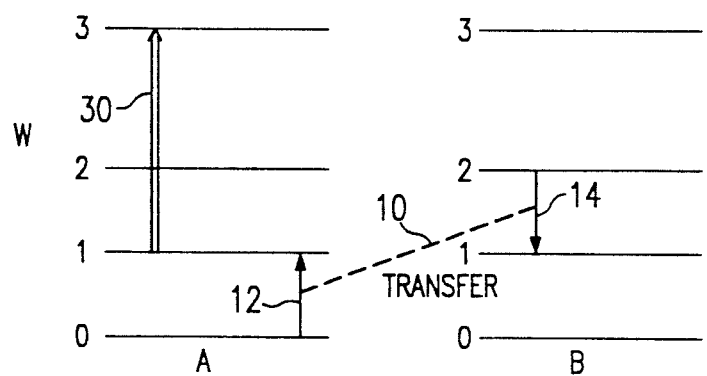
FIG. 3 is a partial energy level diagram similar to that used in the Case '906 patent, illustrating the substantially equal energy spacing between the three lowest levels and the transfer of energy from one elemental physical system to another elemental physical system to raise an electron to an excited energy level.
Figure 4A:
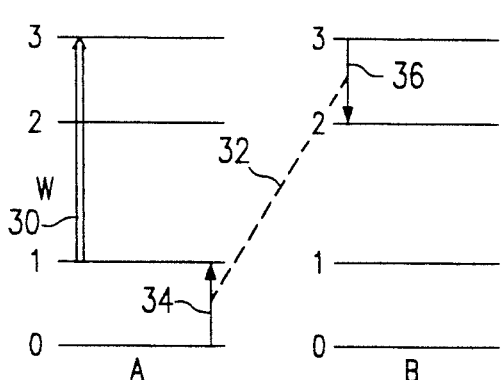
FIGS. 4A–4D are partial energy level diagrams illustrating the transfer of energy from one elemental physical system to another elemental physical system to raise an electron to an excited energy level.

The embodiment of FIG. 4A illustrates pumping between energy levels 1 and 3 with pump 30. Pumping between these energy levels raises an electron from energy level i to energy level 3. In FIG. 4A and subsequent figures, energy level 1 is not necessarily the first excited energy level, i.e., other energy levels, not of importance for this discussion, may be present between the ground level and energy level 1. Where A and B are of the same species (for example, the same type of ion), both systems A and B are pumped; although the FIGURES only illustrate pumping on System A for clarity.

An electron in energy level 3 of neighboring elemental physical system B transfers its energy, as illustrated by dashed line 32, to raise an electron in elemental physical system A from the ground state to excited energy level 1, as illustrated by arrow 34. This process is an example of the cross-relaxation process discussed previously. As the electron in elemental physical system B transfers its energy to elemental physical system A, it moves from excited energy level 3 to excited energy level 2, as illustrated by arrow 36. A subsequent decay takes the electron in system B to level 1 (not shown) where it can be pumped by pump 30. The method illustrated in FIG. 4A is not, however, considered to be a preferred technique. The energy of pump 30 which pumps an electron from energy level 1 to energy level 3 is the exact amount of energy to pump an electron from the ground state to energy level 2, which interferes with the process of populating energy level 1.

Figure 4B:
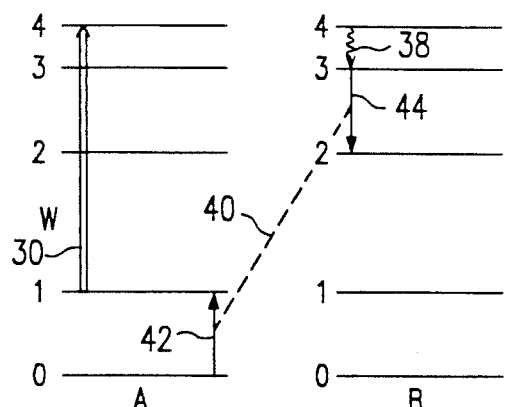

In the embodiment of FIG. 4B, the energy level configuration is such that the energy of pump 30 induces transitions between energy levels 1 and 4, and is not resonant with transitions between any other energy levels. In FIG. 4B, electrons pumped to energy level 4 decay down to energy level 3, as illustrated by wavy line 38. Wavy line 38 represents some decay process, for example the emission of a phonon. An electron in energy level 3 can then transfer its energy, as illustrated by dashed line 40, to raise an electron in a neighboring elemental physical system from the ground state to energy level 1, illustrated by arrow 42. The electron raised to energy level 1 can then be pumped by pump 30 to energy level 4. The electron that was in energy level 3 in elemental physical system B is located in energy level 2, as illustrated by arrow 44, after it transfers its energy to elemental physical system A. Again, as is the case in all the following figures, subsequent decay will take the electron that transfers its energy to energy level 1 (not illustrated).

Figure 4C:
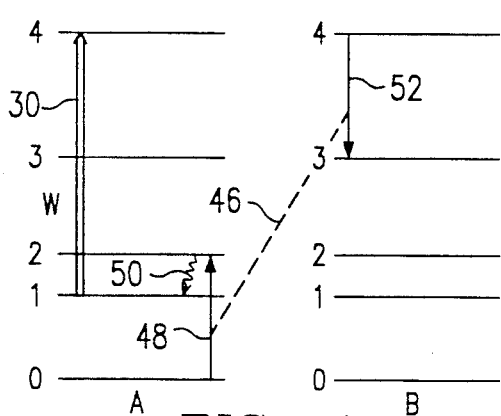

The embodiment of FIG. 4C illustrates a variation of the method illustrated in FIG. 4B. In FIG. 4C, pump 30 induces transitions of electrons from energy level 1 to energy level 4. The electron in neighboring elemental physical system B transfers its energy, illustrated by dashed line 46, to raise an electron in elemental physical system A from the ground state to energy level 2, as illustrated by arrow 48. The electron in energy level 2 then decays down to energy level 1, as illustrated by wavy line 50, and this electron can be pumped to energy level 4. The electron in energy level 4 of elemental physical system B is located in energy level 3 after it transfers its energy to elemental physical system A, as illustrated by arrow 52.

Figure 4D:
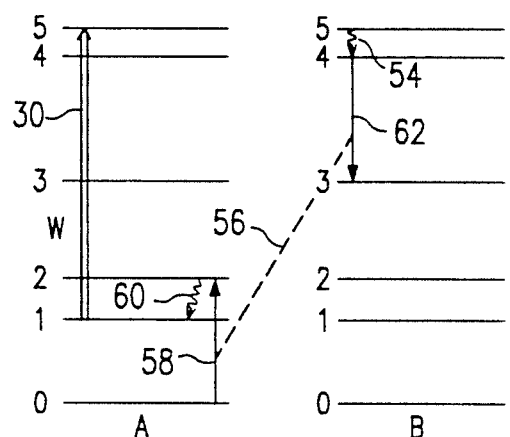

The embodiment of FIG. 4D combines the features of FIGS. 4B and 4C. In FIG. 4D, pump 30 pumps an electron from energy level 1 to energy level 5. The electron in energy level 5 decays to energy level 4, as illustrated by wavy line 54. The electron in energy level 4 then transfers its energy, as illustrated by dashed line 56, to raise an electron from the ground state to energy level 2, as illustrated by arrow 58. The electron in energy level 2 decays to energy level 1, as illustrated by wavy line 60. As a result of transferring its energy to elemental physical system A, the electron originally in energy level 4 in elemental physical system B ends up in energy level 3, as illustrated by arrow 62.

Figure 5A:
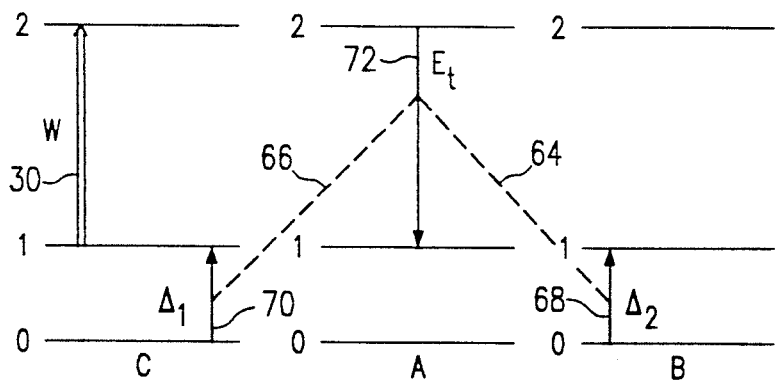
FIGS. 5A and 5B are partial energy level diagrams illustrating the transfer of energy from one elemental physical system to two elemental physical systems to raise an electron to an excited energy level in each of the two elemental physical systems.
Figure 5B:
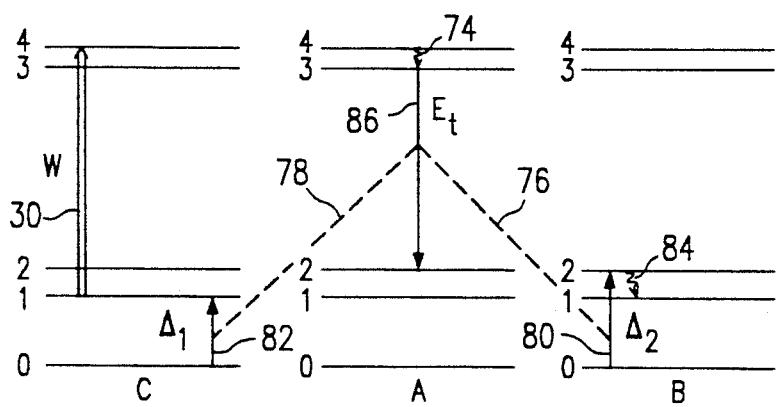

The embodiment of FIGS. 5A and 5B illustrate that more than one neighboring elemental physical system can be involved in populating absorber energy levels. In FIG. 5A, electrons are pumped by pump 30 from energy level 1 to energy level 2. The energy from the electron in energy level 2 is transferred, as illustrated by dashed lines 64 and 66, to raise an electron in elemental physical system B from the ground state to energy level 1, arrow 68, and to raise an electron in elemental physical system C from the ground state to energy level 1, arrow 70. The electron originally in energy level 2 in elemental physical system A ends up in energy level 1 as illustrated by arrow 72. The total energy transferred ($E_t$) from elemental physical system A is equal to the energy needed to raise an electron in elemental physical system C from the ground state to energy level 1 ($\blacktriangle_1$) plus the energy needed to raise an electron in energy configuration B from the ground state to energy level 1 ($\blacktriangle_2$). $E_t = \blacktriangle_1 + \blacktriangle_2$.

As illustrated in FIG. 5B, the total energy transferred from the elemental physical system A does not have to be divided equally between elemental physical systems B and C. In FIG. 5B, the electrons are pumped by pump 30 from energy level 1 to energy level 4. The electron in energy level 4 decays, wavy line 74, to energy level 3. The energy from the electron in energy level 3 is transferred, dashed lines 76 and 78, to raise an electron in elemental physical system B from the ground state to energy level 2, arrow 80 and energy spacing $\blacktriangle_2$, and to raise an electron in elemental physical system C from the ground state to energy level 1, arrow 82 and energy spacing $\blacktriangle_1$. The electron in energy level 2 of elemental physical system B decays, wavy line 84, to energy level 1. The electron originally in energy level 3 of elemental physical system A ends up in energy level 2 as illustrated by arrow 86.

It should be clear that there are other energy level diagrams such that the energy from one elemental physical system could be transferred to more than two neighboring elemental physical systems to raise an electron in each of the neighboring elemental physical systems to an excited energy level.

Figure 6:
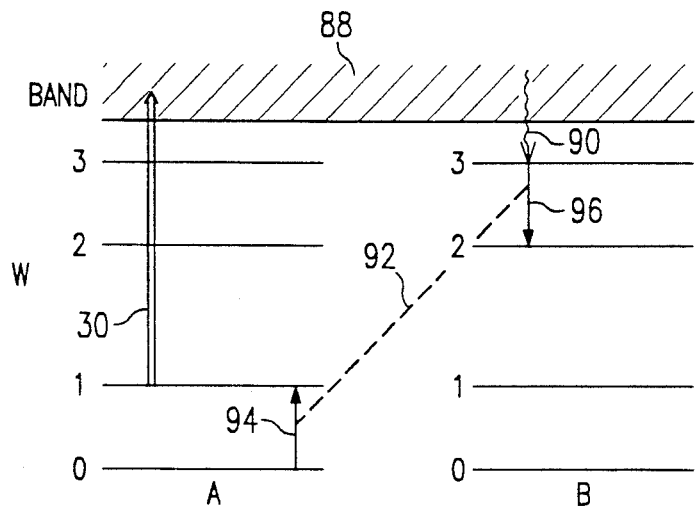
FIG. 6 is a partial energy level diagram illustrating the transfer of energy from one elemental physical system to another elemental physical system, where an energy band is involved.

In the embodiment of FIG. 6, electrons are pumped by pump 30 from energy level 1 into an energy band 88. An energy band is made up of multiple closely spaced energy levels. An electron in energy band 88 decays, wavy line 90, into energy level 3. The energy from the electron in energy level 3 is transferred, dashed line 92, to raise an electron in elemental physical system A from the ground state to energy level 1, arrow 94. The electron in energy level 3 of elemental physical system B ends up in energy level 2, arrow 96.

Pumping from an excited state into an energy band is desirable for two reasons. Most commercially available pumps are designed to induce transitions between two particular energy levels only. The pump rate of these commercially available pumps might not have the desired pump rate needed to create population inversion. The energy band increases the options available for laser pumps.

Any laser pump which pumps between energy level 1 and some energy level in the energy band can be used. It is more likely that a commercially available laser pump, with the desired pumping rate, can be located. Furthermore, since the ability to achieve the desired population inversion might change drastically by pumping between different energy levels, it is desirable to have the option of pumping between different energy levels of the energy band to determine which pumping transition will create the desired results.

In the following claims, transitions between energy levels are explicitly recited, and it should be understood that those levels may reside in energy bands of closely spaced energy levels.

Figure 7A:
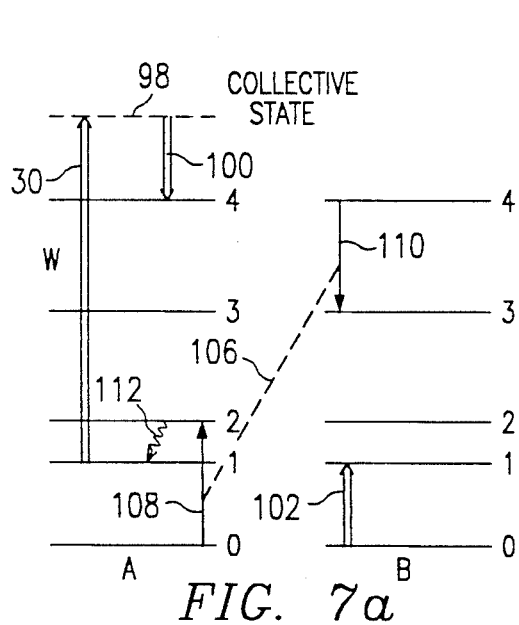
FIGS. 7A and 7B are partial energy level diagrams illustrating the transfer of energy from one elemental physical system to another elemental physical system, where a collective state is involved.
Figure 7B:
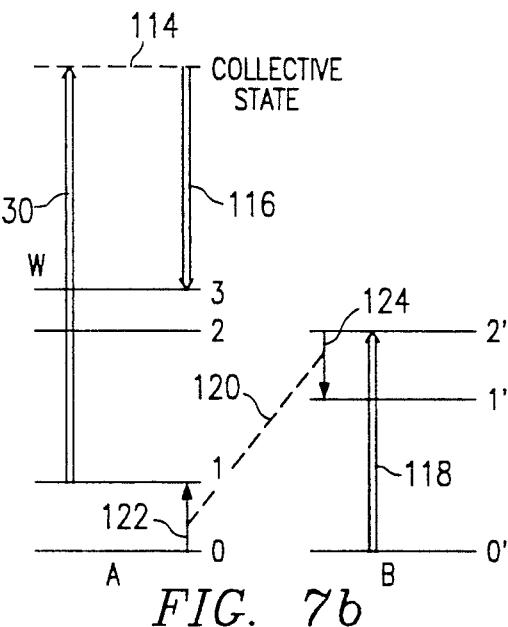

The embodiments of FIGS. 7A and 7B illustrate a process called cooperative absorption, yet another technique of populating energy level 1. In cooperative absorption, two neighboring elemental physical systems together form a collective excitation state—a state which does not exist if the elemental physical systems are sufficiently separated. FIG. 7A illustrates two identical elemental physical systems A and B which together form collective state 98. Pumping between energy level 1 and collective state 98 with pump 30 has the end result of putting an electron in energy level 4 of elemental physical system A, as illustrated by arrow 100, and putting an electron in energy level 1 of elemental physical system B, as illustrated by arrow 102. The energy from energy level 1 to the ground state is equal to the energy between energy level 4 and the collective state 98. The electron in energy level 4 transfers its energy, as illustrated by dashed line 106, to raise an electron in a neighboring elemental physical system from the ground state to energy level 2, as illustrated by arrow 108. After transferring its energy, the electron in energy level 4 ends up in energy level 3, as illustrated by arrow 110. The electron that was raised from the ground state to energy level 2 decays, as illustrated by wavy line 112 to energy level 1.

FIG. 7B also illustrates the cooperative absorption process except that instead of using two identical elemental physical systems to accomplish the process, two different elemental physical system species are used. If these two different elemental physical system species are close enough to each other, they form collective state 114. Pumping between energy level 1 and the collective state 114 with pump 30 has the effect of placing an electron in energy level 3 of elemental physical system A, as illustrated by arrow 116, and placing an electron in energy level 2, of elemental physical system B, as illustrated by arrow 118. The electron in energy level 2' transfers its energy, as illustrated by dashed line 120, to raise an electron from the ground state to energy level 1, as illustrated by arrow 122 After transferring its energy, the electron originally in energy level 2' is now in energy level 1' as illustrated by arrow 124.

It should be noted that a "collective state" has an energy level associated therewith, and as used herein, references to energy levels include those levels associated with collective states.

Figure 8:
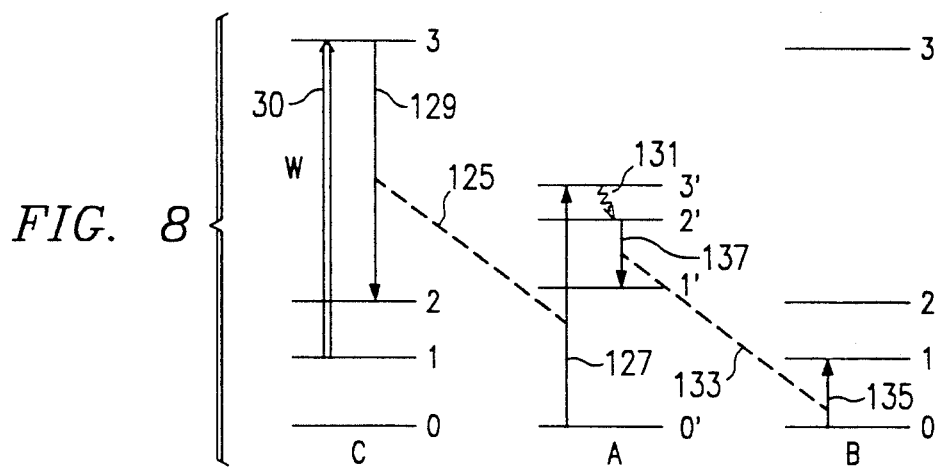
FIG. 8 is a partial energy level diagram illustrating the transfer of energy from a first species type of elemental physical system to a second species type of elemental physical system and transfer of energy from the second species type to a first species type elemental physical system.

The embodiment of FIG. 8 illustrates a process where, rather than having a direct transfer of energy from one elemental physical system to another, an indirect process is involved by transferring the energy to a mediator elemental physical system first and then transferring energy from the mediator to another elemental physical system to raise electrons in this system to excited energy levels. In FIG. 8, the mediator elemental physical system (labeled A) is of a different species than elemental physical systems B and C which are the same species. Pumping between energy level 1 and energy level 3 of elemental physical system C with pump 30 raises an electron to energy level 3.

The electron in energy level 3 of elemental physical system C transfers its energy to elemental physical system A (the mediator), as illustrated by dashed line 125, to raise an electron from the ground state to energy level 3', as illustrated by arrow 127. The electron originally in energy level 3 of elemental physical system C resides in energy level 2 after it transfers its energy, arrow 129. The electron in energy level 3' of the mediator elemental physical system decays, as illustrated by wavy line 131, to energy level 2'. The electron in energy level 2' then transfers its energy, as illustrated by dashed line 133, to raise an electron in elemental physical system B from the ground state to energy level 1, as illustrated by arrow 135. The electron originally in energy level 2' resides in energy level 1', arrow 137, after it transfers energy. The electron in energy level 1' may perhaps transfer its energy, through cross-relaxation processes not illustrated, to further raise electrons in elemental physical systems of species type B and C from the ground state to energy level 1.

Figure 9:
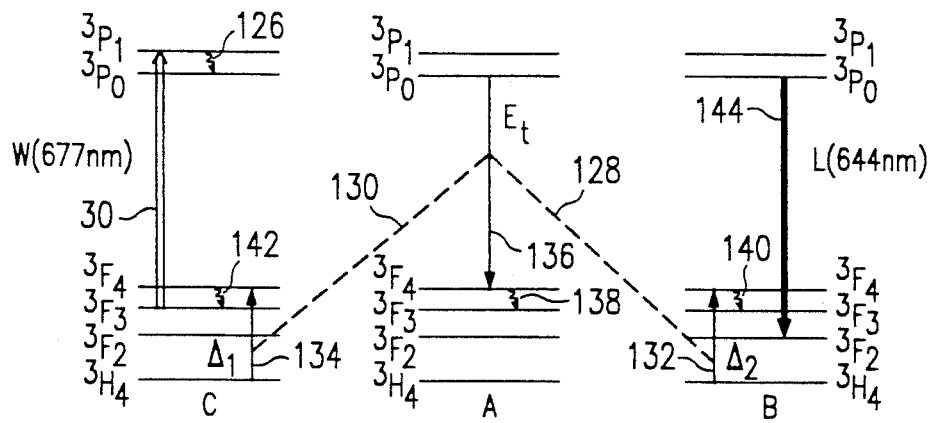
FIG. 9 is a partial energy level diagram of $Pr^{3+}$ ions which are doped in a $LaCl_3$ crystal ($Pr:LaCl_3$ crystal), illustrating the transfer of energy from one $Pr^{3+}$ ion to raise an electron in each of two neighboring $Pr^{3+}$ ions to excited energy levels, leading to laser action.

The embodiment of FIG. 9 illustrates a partial energy level diagram of the $Pr^{3+}$ ion. Pumping on a $LaCl_3$ crystal doped with $Pr^{3+}$ ions, with a wavelength of 677 nanometers (W(677 nm)), has populated the $^3F_3$ energy level, leading to population inversion between energy levels $^3P_0$ and $^3F_2$ and resulting in laser output at 644 nanometers (L(644 nm)).

The process of populating energy level $^3F_3$ is believed to involve a variation of the processes illustrated in FIGS. 5A and 5B. Pumping between energy levels $^3F_3$ and $^3P_1$ with pump 30 raises an electron from $^3F_3$ to $^3P_1$. The electron in $^3P_1$ decays, as illustrated by wavy line 126, to energy level $^3P_0$. The electron in $^3P_0$ transfers its energy, as illustrated by dashed lines 128 and 130, to raise an electron in neighboring ion B of $Pr^{3+}$ from the $^3H_4$ energy level to the $^3F_4$ energy level, as illustrated by arrow 132, and to raise an electron in neighboring ion C of $Pr^{3+}$ from the $^3H_4$ energy level to the $^3F_4$ energy level, as illustrated by arrow 134.

After the electron originally in energy level $^3P_0$ of ion A of $Pr^{3+}$ transfers its energy, it ends up in energy level $^3F_4$, as illustrated by arrow 136. The electron in energy level $_3F_4$ of ion A decays, as illustrated by wavy line 138 to energy level $^3F_3$. The electron in energy level $^3F_4$ of ion B decays, as illustrated by wavy line 140, to energy level $^3F_3$. The electron in energy level $^3F_4$ of ion C decays, as illustrated by Wavy line 142, to energy level $^3F_3$.

If this process is continued, the end result is a population of electrons in energy level $^3F_3$. Once energy level $^3F_3$ is populated, further pumping on this energy level creates the population inversion between energy levels $^3P_0$ and $^3F_2$ necessary for laser action. In this case, with the proper equipment set-up, as described with FIG. 10 below, laser action results at a wavelength of 644 nanometers equaling the energy difference between energy level $^3P_0$ and energy level $^3F_2$, illustrated by arrow 144.

Figure 10:
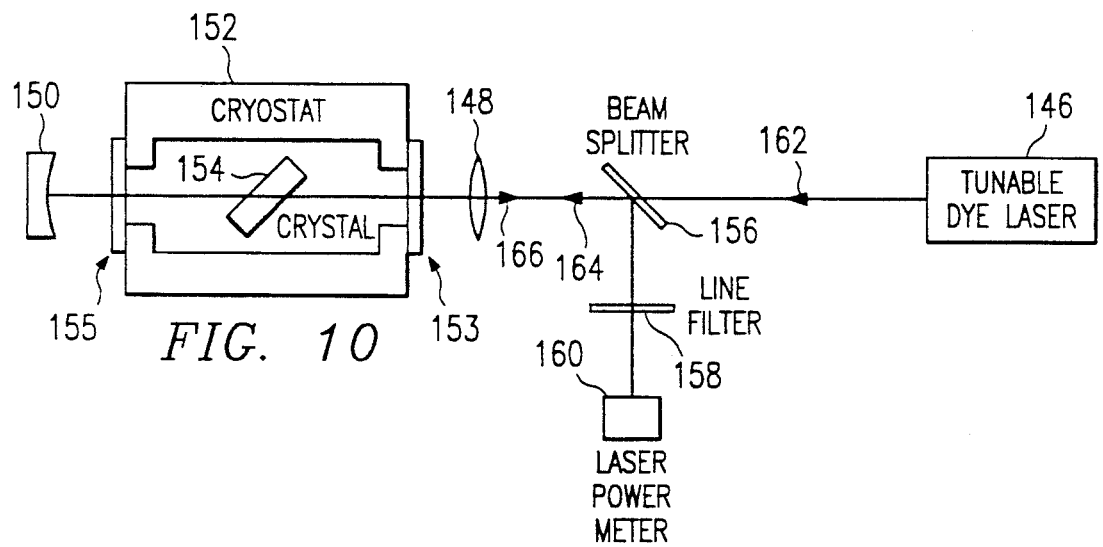
FIG. 10 illustrates the equipment set-up used to create laser action and to detect laser action in the $Pr:LaCl_3$ crystal.

The embodiment of FIG. 10 illustrates the equipment used in achieving laser action in Pr:LaCl3 crystal 154 (LaCl3 crystal doped with $Pr^{3+}$ ions), and used in testing the results. Continuous-wave tunable dye laser 146 is the pumping laser and pumps at a wavelength of 677 nanometers (nm). FIG. 10 illustrates lens 148, mirror 150, and a cryostat 152 in which the Pr:LaCl3 crystal 154 is contained. Cryostat 152 contains a mirror 153 and a window 155. Crystal 154 is 1–2 millimeters thick. The function of the cryostat 152 is to refrigerate the crystal 154 at 80° K and to contain the crystal in a vacuum environment. FIG. 9 also illustrates beam splitter 156, line filter 158, and laser power meter 160 which detects laser light.

The laser light at 677 nm emitted from dye laser 146 is transmitted through beam splitter 156 towards crystal 154 in the direction of arrows 162 and 164. The laser light is also transmitted through lens 148. Lens 148 focuses the laser light so that it is transmitted through mirror 153 of cryostat 152 onto crystal 154. Mirror 153 permits most of the laser light to transmit through it to the crystal 154.

The transmission of the laser light onto crystal 154 leads to the emission of laser light from crystal 154, according to the process described with regard to FIG. 9. The laser light that is generated is transmitted through window 155 and reflected off of mirror 150, back through crystal 154 or reflected off of mirror 153 back through crystal 154, or transmitted through mirror 153 towards beam splitter 156, in the direction of arrow 166.

Mirrors 150 and 153 form an optical cavity such that emitted light reflected back through crystal 154 and between mirrors 150 and 153 is amplified. Part of this amplified light exhibiting optical gain is again reflected off of the mirrors 150 and 153, and part is transmitted through the mirror in the direction of arrow 166. The laser light emitted from mirror 153 in the direction of arrow 166 is reflected off of beam splitter 156 towards line filter 158. Line filter 158 only passes laser light. In this case, the laser light that is emitted has a wavelength of 644 nm. This laser light is passed through line filter 158 and detected by laser power meter 160.

Figure 11:
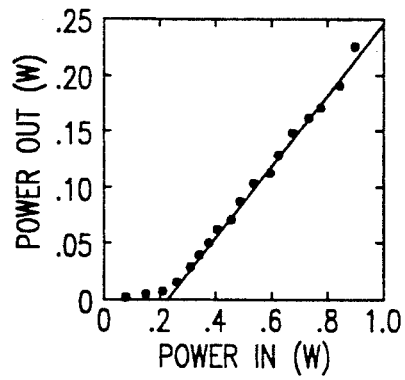
FIG. 11 is a plot of watts of power-in versus watts of power-out when the equipment set-up of FIG. 9 is used to create laser action in the $Pr:LaCl_3$ crystal.

The embodiment of FIG. 11 illustrates a comparison of the power-in (measured in watts-W) compared to the power-out (also measured in watts-W) by pumping on crystal 154. This graph illustrates that approximately 250 milliwatts of laser light at 644 nm results from optical pumping, with dye laser 146, crystal 154 with 1 watt of laser light at 677 nm. This is approximately a 25% conversion efficiency of input power versus output power.

Sustaining significant excited energy level populations by pumping on an excited energy level is known to occur for ions in host crystals other than Pr:LaCl$_3$, for example, PrCl$_3$, UCl$_3$, U:LaCl$_3$, Er:YLiF$_4$, Pr:LaBr$_3$, Er:BaY$_2$F$_8$, Nd:Ylif$_4$, Nd:LaCl$_3$, Sm:LaBr$_3$, and HoCl$_3$ No attempts have been made as yet to initiate laser action in any of these crystals. In addition to a continuous wave laser, a pulsed laser may also be used; however, it is necessary that the pulse rate be higher than the decay rate of the "pump from" level for efficient pump absorption. Also, it should be noted that the average power of the pulsed laser should be above the corresponding continuous wave power needed to populate the "pump from" level, as explained earlier.

Figure 12:
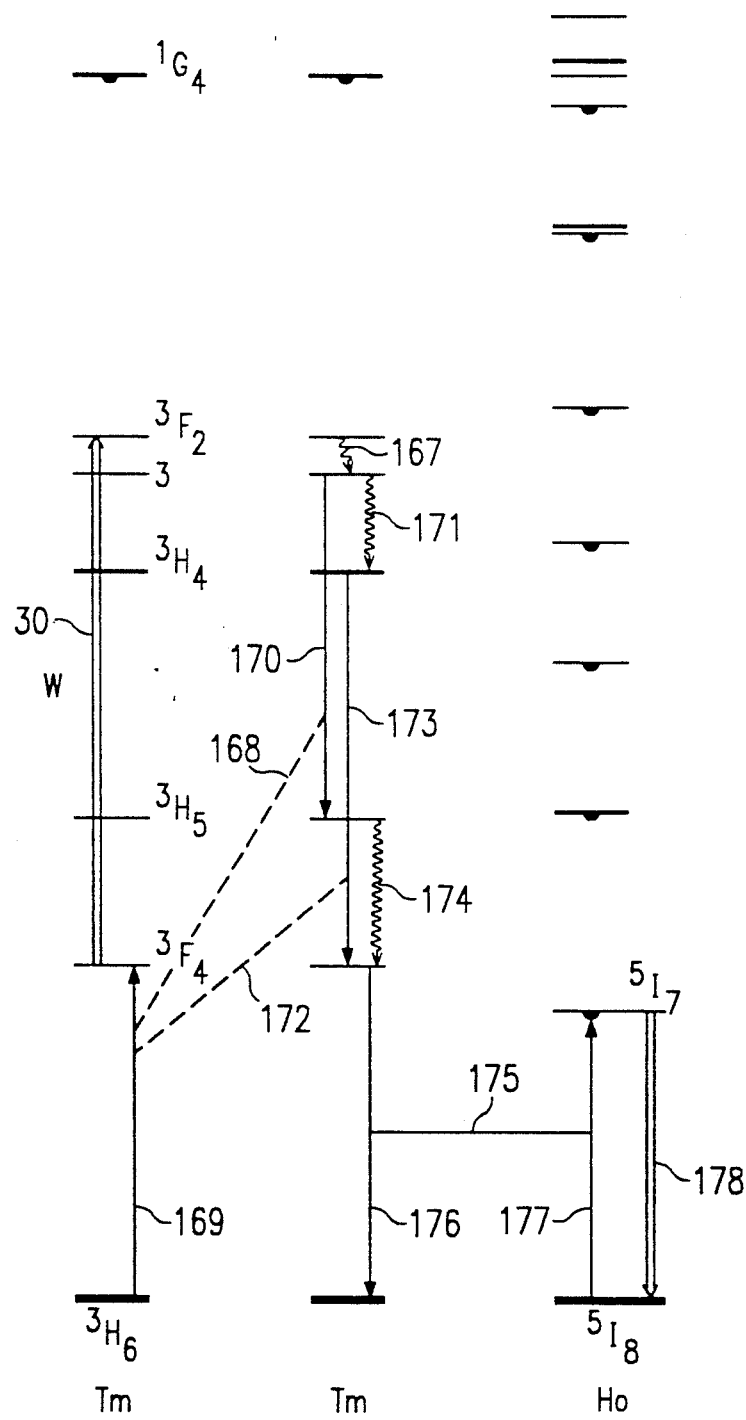
FIG. 12 is a partial energy level diagram for a thulium to holmium cross-pumping scheme.

The embodiment of FIG. 12 shows a photon avalanche cross-pumping scheme using thulium (Tm) and holmium (Ho). A medium (for example, a YAG crystal) is made having dopants such as thulium and holmium ions. Typical dopant concentrations in Tm-Ho lasers pumped from the ground state are 16:1 respectively or $8 \times 10^{20}$ cm$^{-3}$ Tm$^{+3}$ and $5 \times 10^{19}$ cm$^{-3}$ Ho$^{3+}$. An energy source supplies pumping energy of the appropriate frequency 30 to raise electrons from the $^3F_4$ level to the $^3F_2$ level. Fast decay 167 of $^3F_2$ to $^3F_3$ ensues. $^3F_3$ then cross relaxes (168) with a ground state ion promoting the ground state ion to $^3F_4$ (169) and leaving the excited ion in $^3H_5$ (170). The $^3H_5$ state ion may then decay (174) to the $^3F_4$ state. Alternatively, the $^3F_3$ state ion might decay (171) to a $^3H_4$ state ion. Cross relaxation (172) of $^3H_4$ ensues leaving the excited state ion and the ground state ion in $^3F_4$ states, lines 173 and 169 respectively. Multiple $^3F_4$ state ions are produced per pump photon absorbed. Fast cross pumping 175 from Tm ($^3F_4$) to Ho ($^5I_8$) is known to occur leaving the Tm ion in the ground state. Laser action of the $^5I_7$ to $^5I_8$ transition takes place for efficient pumping.

Decay from Ho $^5I_7$ emits coherent light at about 2.086 microns. The medium is used to create a 2.086 micron laser by replacing crystal 154 with the medium in a device similar to that shown in FIG. 10. For this configuration, mirror 153 allows transmission of substantially all of the pump wavelength (about 1.04 microns) and reflects the vast majority of the emitted wavelength (about 2.086 microns). In such a device, the medium replaces the Pr:LaCl$_3$ crystal and a Ti:Al$_2$O$_3$ laser replaces the tunable dye laser. Cross relaxation 172 is similar to the Case '906 patent method. Current literature favors cross-relaxation 172 over 168.

At one time, it was believed that the embodiment for the cross-pumped laser should use a medium made from a LaCl$_3$ crystal doped with Pr as the majority dopant, and Nd as the minority dopant. However, such a medium appears to be satisfactory only at very low temperatures. It is now believed that crystals, for example YAG, YLF, and YSGG, doped with ions, for example, Tm as the majority dopant and Ho as the minority dopant, provide better performance at temperatures near 80 degrees Kelvin.

There are numerous ways of populating excited energy levels (also known as absorber levels) by varying or combining the above methods. Furthermore, the elemental physical systems could be atoms, molecules, ions or nuclei. The elemental physical systems could also be free fundamental particles moving in a periodic electromagnetic field, or electrons and holes in a quantum-well structure. The above elemental physical systems can exist in the solid state, the liquid state, the gaseous state, or the plasma state.

Instead of electrons being transferred between different energy levels, other fundamental particles such as nucleons and or muons, could be involved. The energy levels can result from electronic, vibrational or rotational motions or result from any combination of these motions. The energy levels can also result from nuclear or muonic motions.

Thus, it should be understood that there are many methods of populating excited energy levels so that these excited energy levels can be further pumped to create population inversion resulting in optical gain and even laser action at a desired wavelength as a matter of engineering choices without departing from the spirit and scope of the invention, as defined by the appended claims.

We claim:

1. A device for generating populations of electrons in excited levels of elemental physical systems, selected from the group consisting of atoms, molecules, and ions, said device comprising:
    a container for containing a plurality of said elemental physical systems, each of said elemental physical systems having associated therewith at least:
        a ground level,
        a "pump from " level which is different from the ground level,
        a "pump to" level,
        an "excite to" level,
        a "decay to" level, and
        a plurality of electrons residing in said levels, depending upon the energy state for each electron;
    said "pump from" level having electrons with energy states which are lower than the energy states of the electrons on said "excite to" level; and
    an energy source, positioned and arranged to supply energy to said plurality of elemental physical systems over a preselected energy range such that substantially only electrons residing in said "pump from" level absorb energy from said energy source and transition to said "pump to" level at a rate greater than the rate at which electrons decay from said "pump from" level to said ground level, whereby an electron at the "pump to" level, in the process of transitioning to the "decay to" level, transfers at least part of its energy to raise an electron in the ground level to the "excite to" level which is then available for pumping to the "pump to" level.

2. A device as in claim 1 wherein said energy source is a continuous wave laser.

3. A device as in claim 1 wherein said energy source is a pulsed laser.

4. A device as in claim 1 wherein said energy source comprises a laser having an output wavelength of about 677 nanometers.

5. A device as in claim 1, wherein said energy source comprises a laser having a medium comprising $Ti:Al_2O_3$.

6. A device as in claim 1 wherein at least some of said ions comprise rare earth ions.

7. A device as in claim 1 wherein at least some of said ions comprise actinide ions.

8. A device as in claim 1 wherein at least some of said ions comprise transition metal ions.

9. A device as in claim 1 wherein at least some of said ions comprise Pr.

10. A device as in claim 1 wherein at least some of said ions comprise Ho.

11. A device as in claim 1 wherein at least some of said ions comprise Tm.

12. A device as in claim 1 wherein said ions reside in a gas.

13. A device as in claim 1 wherein said ions reside in a crystal.

14. A device as in claim 13 wherein said crystal comprises YAG.

15. A device as in claim 13 wherein said crystal comprises YAG, a majority dopant of Tm, and a minority dopant of Ho.

16. A device as in claim 13 wherein said crystal comprises $LaCl_3$.

17. A device as in claim 16 wherein said crystal is doped with $Pr^{+3}$ ions.

18. A device for generating populations of electrons in excited levels of elemental physical systems, selected from the group consisting of atoms, molecules, and ions, said device comprising:

a container for containing a plurality of said elemental physical systems, each of said elemental physical systems having associated therewith at least:
a ground level,
a "pump from" level which is different from the ground level,
a "pump to" level,
an "excite to" level having an energy level at least as high as the "pump from" level,
a "decay to" level, and
a plurality of electrons residing in said levels, depending upon the energy state for each electron;

said "pump from" level having electrons with energy states which are lower than the energy states of the electrons on said "decay to" level; and an energy source, positioned and arranged to supply energy to said plurality of elemental physical systems over a preselected energy range such that substantially only electrons residing in said "pump from" level absorb energy from said energy source and transition to said "pump to" level at a rate greater than the rate at which electrons decay from said "pump from" level to said ground level, whereby an electron at the "pump to" level, in the process of transitioning to the "decay to" level, transfers at least part of its energy to raise an electron in the ground level to the "excite to" level which is then available for pumping to the "pump to" level.

19. A device as in claim 18 wherein said energy source is a continuous wave laser.

20. A device as in claim 18 wherein said energy source is a pulsed laser.

21. A device as in claim 18 wherein said energy source comprises a laser having an output wavelength of about 677 nanometers.

22. A device as in claim 18 wherein said energy source comprises a laser having a medium comprising $Ti:Al_2O_3$.

23. A device as in claim 18 wherein at least some of said ions comprise rare earth ions.

24. A device as in claim 18 wherein at least some of said ions comprise actinide ions.

25. A device as in claim 18 wherein at least some of said ions comprise transition metal ions.

26. A device as in claim 18 wherein at least some of said ions comprise Pr.

27. A device as in claim 18 wherein at least some of said ions comprise Ho.

28. A device as in claim 18 wherein at least some of said ions comprise Tm.

29. A device as in claim 18 wherein said ions reside in a gas.

30. A device as in claim 18 wherein said ions reside in a crystal.

31. A device as in claim 30 wherein said crystal comprises $LaCl_3$.

32. A device as in claim 31 wherein said crystal is doped with $Pr^{+3}$ ions.

33. A device as in claim 30 wherein said crystal comprises YAG.

34. A device as in claim 30 wherein said crystal comprises YAG, a majority dopant of Tm, and a minority dopant of Ho.

35. A device for generating populations of electrons in excited levels of elemental physical systems, selected from the group consisting of atoms, molecules, and ions, said device comprising:

a container for containing a plurality of said elemental physical systems, each of said elemental physical systems having associated therewith at least:
a ground level,
a "pump from" level which is different from the ground level,
a "pump to" level,
an "excite to" level having an energy level at least as high as the "pump from" level,
a "decay to" level, and
a plurality of electrons residing in said levels, depending upon the energy state for each electron;

said "decay to" level having electrons with energy states which are different from the energy states of the electrons on said "excite to" level; and an energy source, positioned and arranged to supply energy to said plurality of elemental physical systems over a preselected energy range such that substantially only electrons residing in said "pump from" level absorb energy from said energy source and transition to said "pump to" level at a rate greater than the rate at which electrons decay from said "pump from" level to said ground level, whereby an electron at the "pump to" level, in the process of transitioning to the "decay to" level, transfers at least part of its energy to raise an electron in the ground level to the "excite to" level which is then available for pumping to the "pump to" level.

36. A device as in claim 35 wherein said energy source is a continuous wave laser.

37. A device as in claim 35 wherein said energy source is a pulsed laser.

38. A device as in claim 35 wherein said energy source comprises a laser having an output wavelength of about 677 nanometers.

39. A device as in claim 35 wherein said energy source comprises a laser having a medium comprising $Ti:Al_2O_3$.

40. A device as in claim 35 wherein at least some of said ions comprise rare earth ions.

41. A device as in claim 35 wherein at least some of said rare earth ions comprise actinide ions.

42. A device as in claim 35 wherein at least some of said ions comprise transition metal ions.

43. A device as in claim 35 wherein at least some of said ions comprise Pr.

44. A device as in claim 35 wherein at least some of said ions comprise Ho.

45. A device as in claim 35 wherein at least some of said ions comprise Tm.

46. A device as in claim 35 wherein said ions reside in a gas.

47. A device as in claim 35 wherein said ions reside in a crystal.

48. A device as in claim 47 wherein said crystal comprises $LaCl_3$.

49. A device as in claim 48 wherein said crystal is doped with $Pr^{+3}$ ions.

50. A device as in claim 47 wherein said crystal comprises YAG.

51. A device as in claim 47 wherein said crystal comprises YAG, a majority dopant of Tm, and a minority dopant of Ho.

52. A device for generating populations of electrons in excited levels of elemental physical systems, selected from the group consisting of atoms, molecules, and ions, said device comprising:

a container for containing a plurality of said elemental physical systems, each of said elemental physical systems having associated therewith at least:
a ground level,
a "pump from" level which is different from the ground level,
a "pump to" level,
an "excite to" level having an energy level at least as high as the "pump from" level,
a "decay from" level,
a "decay to" level, and
a plurality of electrons residing in said levels, depending upon the energy state for each electron;
the energy difference between said "decay from" level and said "decay to" level being different from the energy difference between said "excite to" level and said ground level; and an energy source, positioned and arranged to supply energy to said plurality of elemental physical systems over a preselected energy range such that substantially only electrons residing in said "pump from" level absorb energy from said energy source and transition to said "pump to" level at a rate greater than the rate at which electrons decay from said "pump from" level to said ground level, whereby an electron at the "pump to" level, in the process of transitioning to the "decay to" level, transfers at least part of its energy to raise an electron in the ground level to the "excite to" level which is then available for pumping to the "pump to" level.

53. A device as in claim 52 wherein said energy source is a continuous wave laser.

54. A device as in claim 52 wherein said energy source is a pulsed laser.

55. A device as in claim 52 wherein said energy source comprises a laser having an output wavelength of about 677 nanometers.

56. A device as in claim 52 wherein said energy source comprises a laser having a medium comprising $Ti:Al_2O_3$.

57. A device as in claim 52 wherein at least some of said ions comprise rare earth ions.

58. A device as in claim 52 wherein at least some of said rare earth ions comprise actinide ions.

59. A device as in claim 52 wherein at least some of said ions comprise transition metal ions.

60. A device as in claim 52 wherein at least some of said ions comprise Pr.

61. A device as in claim 52 wherein at least some of said ions comprise Ho.

62. A device as in claim 52 wherein at least some of said ions comprise Tm.

63. A device as in claim 52 wherein said ions reside in a gas.

64. A device as in claim 52 wherein said ions reside in a crystal.

65. A device as in claim 64 wherein said crystal comprises $LaCl_3$.

66. A device as in claim 65 wherein said crystal is doped with $Pr^{+3}$ ions.

67. A device as in claim 64 wherein said crystal comprises YAG.

68. A device as in claim 64 wherein said crystal comprises YAG, a majority dopant of Tm, and a minority dopant of Ho.

69. A device for generating populations of electrons in excited levels of elemental physical systems, selected from the group consisting of atoms, molecules, and ions, said device comprising:

a container for containing a plurality of said elemental physical systems, each of said elemental physical systems having associated therewith at least:
a ground level,
a "pump from" level which is different from the ground level,
a "pump to" level,
an "excite to" level,
a "decay from" level,
a "decay to" level, and
a plurality of electrons residing in said levels, depending upon the energy state for each electron;
the energy difference between said "decay from" level and said "decay to" level being different from the energy difference between said "excite to" level and said ground level; and said "decay to" level having an energy level which is different from said "excite to" level;

said "pump from" level having an energy level which is lower than said "decay to" level;

said "pump from" level having an energy level which is lower than said "excite to" level;

an energy source, positioned and arranged to supply energy to said plurality of elemental physical systems over a preselected energy range such that substantially only electrons residing in said "pump from" level absorb energy from said energy source and transition to said "pump to" level at a rate greater than the rate at which electrons decay from said "pump from" level to said ground level, whereby an electron at the "pump to" level, in the process of transitioning to the "decay to" level, transfers at least part of its energy to raise an electron in the ground level to the "excite to" level which is then available for pumping to the "pump to" level.

70. A device as in claim 69 wherein said energy source is a continuous wave laser.

71. A device as in claim 69 wherein said energy source is a pulsed laser.

72. A device as in claim 69 wherein said energy source comprises a laser having an output wavelength of about 677 nanometers.

73. A device as in claim 69 wherein said energy source comprises a laser having a medium comprising $Ti:Al_2O_3$.

74. A device as in claim 69 wherein at least some of said ions comprise rare earth ions.

75. A device as in claim 69 wherein at least some of said rare earth ions comprise actinide ions.

76. A device as in claim 69 wherein at least some of said ions comprise transition metal ions.

77. A device as in claim 69 wherein at least some of said ions comprise Pr.

78. A device as in claim 69 wherein at least some of said ions comprise Ho.

79. A device as in claim 69 wherein at least some of said ions comprise Tm.

80. A device as in claim 69 wherein said ions reside in a gas.

81. A device as in claim 69 wherein said ions reside in a crystal.

82. A device as in claim 81 wherein said crystal comprises $LaCl_3$.

83. A device as in claim 82 wherein said crystal is doped with $Pr^{+3}$ ions.

84. A device as in claim 81 wherein said crystal comprises YAG.

85. A device as in claim 81 wherein said crystal comprises YAG, a majority dopant of Tm, and a minority dopant of Ho.

86. A device for generating populations of electrons in excited levels of elemental physical systems, selected from the group consisting of atoms, molecules, and ions, said device comprising:

a container for containing a first set of elemental physical systems, each of said elemental physical systems having associated therewith at least:
a ground level,
a "pump from" level which is different from the ground level,
a "pump to" level,
an "excite to" level having an energy level at least as high as the "pump from" level,
a "decay to" level, and
a plurality of electrons residing in said levels, depending upon the energy state for each electron;

an energy source, positioned and arranged to supply energy to said first set of elemental physical systems over a preselected energy range such that substantially only electrons residing in said "pump from" level absorb energy from said energy source and transition to said "pump to" level at a rate greater than the rate at which electrons decay from said "pump from" level to said ground level; and a second set of elemental physical systems which are cross-pumped by transitions occurring in said first set.

87. A device as in claim 86 wherein said energy source is a continuous wave laser.

88. A device as in claim 86 wherein said energy source is a pulsed laser.

89. A device as in claim 86 wherein said energy source comprises a laser having an output wavelength of about 677 nanometers.

90. A device as in claim 86, wherein said energy source comprises a laser having a medium comprising $Ti:Al_2O_3$.

91. A device as in claim 86 wherein at least some of said ions comprise rare earth ions.

92. A device as in claim 86 wherein at least some of said ions comprise actinide ions.

93. A device as in claim 86 wherein at least some of said ions comprise transition metal ions.

94. A device as in claim 86 wherein at least some of said ions comprise Pr.

95. A device as in claim 86 wherein at least some of said ions comprise Ho.

96. A device as in claim 86 wherein at least some of said ions comprise Tm.

97. A device as in claim 86 wherein said ions reside in a gas.

98. A device as in claim 86 wherein said ions reside in a crystal.

99. A device as in claim 98 wherein said crystal comprises $LaCl_3$.

100. A device as in claim 99 wherein said crystal is doped with $Pr^{+3}$ ions.

101. A device as in claim 98 wherein said crystal comprises YAG.

102. A device as in claim 98 wherein said crystal comprises YAG, a majority dopant of Tm, and a minority dopant of Ho.

103. An apparatus for generating a plurality of electrons in excited levels of ions, comprising:

a container for containing a crystal doped with ions, each ion having associated therewith at least:
a ground energy state level,
a "pump from" energy state level which is higher than the ground energy state level,
a "pump to" energy state level,
an "excite to" energy state level which is higher than the "pump from" energy state level,
a "decay from" energy state level,
a "decay to" energy state level which is higher than the "pump from" energy state level and different from the "excite to" energy state level, and
a plurality of electrons having energy states associated therewith, each electron residing on a level, depending upon the energy state for that electron; and a laser, positioned and arranged to supply energy at a preselected energy range so that substantially only the electrons residing in said "pump from" level absorb energy from said laser, said energy absorption causing the electrons in the "pump from" level to transition to said "pump to" level at a rate greater than the rate at which electrons decay from said "pump from" level to said ground level, whereby an electron at the "pump to" level, in the process of transitioning to the "decay to" level, transfers at least part of its energy to raise an electron in the ground level to the "excite to" level which is then available for pumping to the "pump to" level.

* * * * *

UNITED STATES PATENT AND TRADEMARK OFFICE
CERTIFICATE OF CORRECTION

PATENT NO. : 5,164,953
DATED : November 17, 1992
INVENTOR(S) : William E. Case et al It is certified that error appears in the above-identified patent and that said Letters Patent is hereby corrected as shown below:

Column 2, line 5, change "electronic vibrational" to --electronic, vibrational--.

Column 9, line 56, change "is partial" to --is a partial--.

Column 10, line 58, change "level i" to --level 1--.

Column 11, line 12, change "level i" to --level 1--.

Column 13, line 36, change "2," to --2'--.

Column 13, line 37, change "B." to --B,--.

Column 13, line 40, change "arrow 122 After" to --arrow 122. After--.

Column 14, line 38, change "Wavy" to --wavy--.

Column 14, line 50, change "crystal !54" to --crystal 154--.

Column 15, line 37, change "$HoCl_3$" to --$HoCl_3$.--.

Column 19, line 42, change "$Pr^{-3}$" to --$Pr^{+3}$--.

UNITED STATES PATENT AND TRADEMARK OFFICE
CERTIFICATE OF CORRECTION

PATENT NO. : 5,164,953
DATED : November 17, 1992
INVENTOR(S) : William E. Case et al It is certified that error appears in the above-identified patent and that said Letters Patent is hereby corrected as shown below:

Column 21, line 8, change "level;" to --level; and--.

Signed and Sealed this

Fifth Day of July, 1994

Attest:

BRUCE LEHMAN

Attesting Officer

Commissioner of Patents and Trademarks